INVENTORS: D. J. BARTELINK
G. E. SMITH
BY David P. Kelley
ATTORNEY

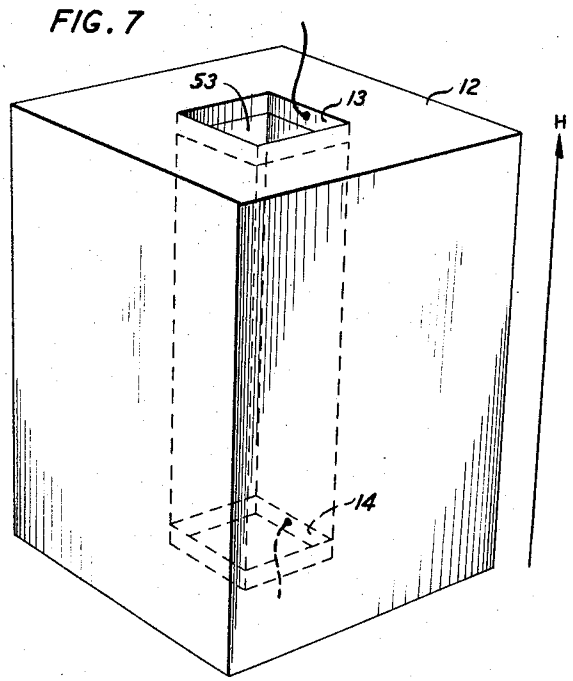
FIG. 8
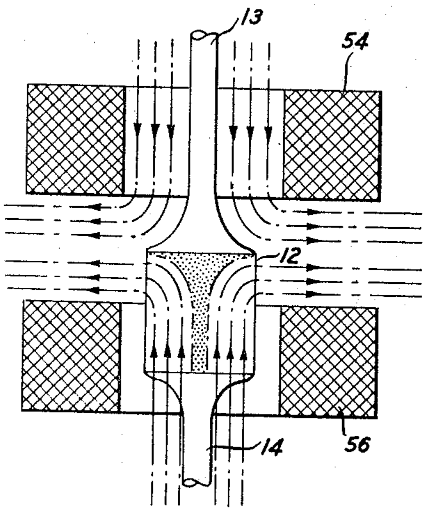
FIG. 9
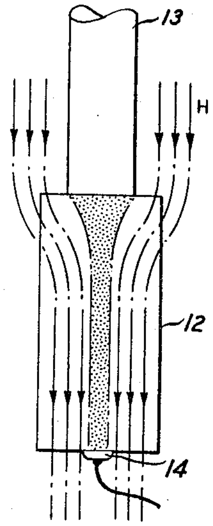

United States Patent Office 3,336,532
Patented Aug. 15, 1967

3,336,532

TRAVELING-WAVE SOLID STATE PLASMA AMPLIFIER WITH CHARGE FLOW CONSTRAINING MEANS

Dirk J. Bartelink, Westfield, and George E. Smith, Berkeley Heights, N.J., assignors to Bell Telephone Laboratories, Incorporated, New York, N.Y., a corporation of New York Filed Mar. 23, 1964, Ser. No. 353,688
9 Claims. (Cl. 330—5)

This invention relates to electronic devices and, more particularly, to such devices which produce amplification through the interaction between a flow of charges in a solid and an electromagnetic wave propagating through the solid.

In the operation of solid state devices utilizing the interaction between charge flow, known in the art as a plasma flow, and an electromagnetic wave, the charges transfer power to the wave in a manner analogous to the operation of a traveling wave tube. Such devices possess certain advantages over traveling wave tubes, however, in that they do not require a vacuum, nor the generally complicated focusing schemes necessary to maintain a nondivergent electron beam in the vacuum.

Heretofore, the full potential of these solid state devices has not been realized because of a number of factors. In general, prior art solid state devices have not produced interaction over the entire cross section of current or charge flow, hence much of the energy that could be used for amplification has been wasted. A corollary of this drawback is the absence of a large energy or power concentration in the interaction region. In addition, the performance of most such devices is impaired as a result of losses through heating, losses resulting from the presence of leakage paths, and the direct transmission of unamplified signals from the input to the output outside of the interaction region or path.

It is, therefore, an object of the present invention to produce amplification of electromagnetic wave signals in a solid in which interaction between the wave and a flow of charges takes place over the entire cross section of the charge flow.

It is another object of the invention to produce high gain in such a device by producing a high current or charge flow density in the interaction region.

It is still another object of the present invention to produce efficient amplification substantially free from unwanted thermal effects and leakage signal currents in a solid state amplifier.

It is a further object of the present invention to eliminate direct transmission of unamplified waves between input and output in a solid state amplifier.

These and other objects of the invention are achieved in a first illustrative embodiment thereof in which a block of material, such as bismuth or antimony or other material having a high transverse magneto-resistive characteristic, is positioned in a longitudinally extending magnetic field and is maintained at a low temperature such as, for example, 4.2 degrees Kelvin. At each end of the block are connected current leads which are connected to a voltage source so that, upon application of voltage to the block, a charge current flows through the block parallel to the magnetic field. This power supply current is the current which carries the energy necessary for amplification. Input signals to be amplified are applied to the block adjacent one end thereof by means of a pair of spaced parallel holes drilled through the block in a direction normal to the direction of charge flow and the magnetic field. Within each hole is a coil, and the coils are connected to the signal source. Upon application of a signal to the coils, a plane polarized electromagnetic wave is launched within the block having a direction of propagation parallel to the direction of the magnetic field and of the charge or current flow. Adjacent the end of the block opposite the input end is a second pair of spaced parallel holes drilled through the block in a direction normal to the direction of charge flow and the magnetic field, and at right angles to the direction of the input holes. Within each of the holes of the second pair is an output coil, the coils being connected to an output lead. The amplified signal energy induces in the coils an output signal, in a manner which will be more fully explained hereinafter.

In a second illustrative embodiment of the invention, the input holes, instead of being parallel to each other, are drilled through the block at right angles to each other so that they intersect at a point which is removed from the longitudinal centerline of the block. In like manner, the output holes are drilled at right angles to each other so that they intersect at a point removed from the longitudinal centerline of the block and preferably on the other side of that centerline from the point of intersection of the input holes. The planes of both input and output holes are normal to the direction of current flow and of the magnetic field.

In both the first and second illustrative embodiments of the invention, the ends of the input and output holes are closed by conducting material so that surface currents induced within the holes close upon themselves and are effectively prevented from leaking along the surface of the block between input and output.

The arrangement of input and output holes in both illustrative embodiments of the invention serves, in a manner to be explained more fully hereinafter, to confine substantially all of the power supply current or charge flow to a limited cross-section path which extends along the length of the block parallel to, or preferably coaxially with, the longitudinal centerline of the block. Such a confinement produces a high concentration of moving charges in the interaction region, and substantially the entire charge flow takes part in the amplification process.

It is one feature of the present invention that means are utilized to confine the charge flow to a limited cross-section path, thereby making possible a high density charge flow and utilizing substantially all of the charge flow in the amplification process, without adverse thermal effects.

It is another feature of the present invention that the input and output transducers are so oriented relative to each other that amplified signals are extracted by the output transducer whereas signal energy which passes directly from input to output outside of the interaction region is not extracted, as will be explained more fully hereinafter.

It is still another feature of the present invention that means are utilized for effectively suppressing leakage currents.

These and other objects and features of the present invention will be more readily apparent from the following detailed description, taken in conjunction with the accompanying drawings, in which:

FIGS. 5 through 9 depict alternative arrangements for controlling the charge flow in the device of the present invention.

Figure 1:
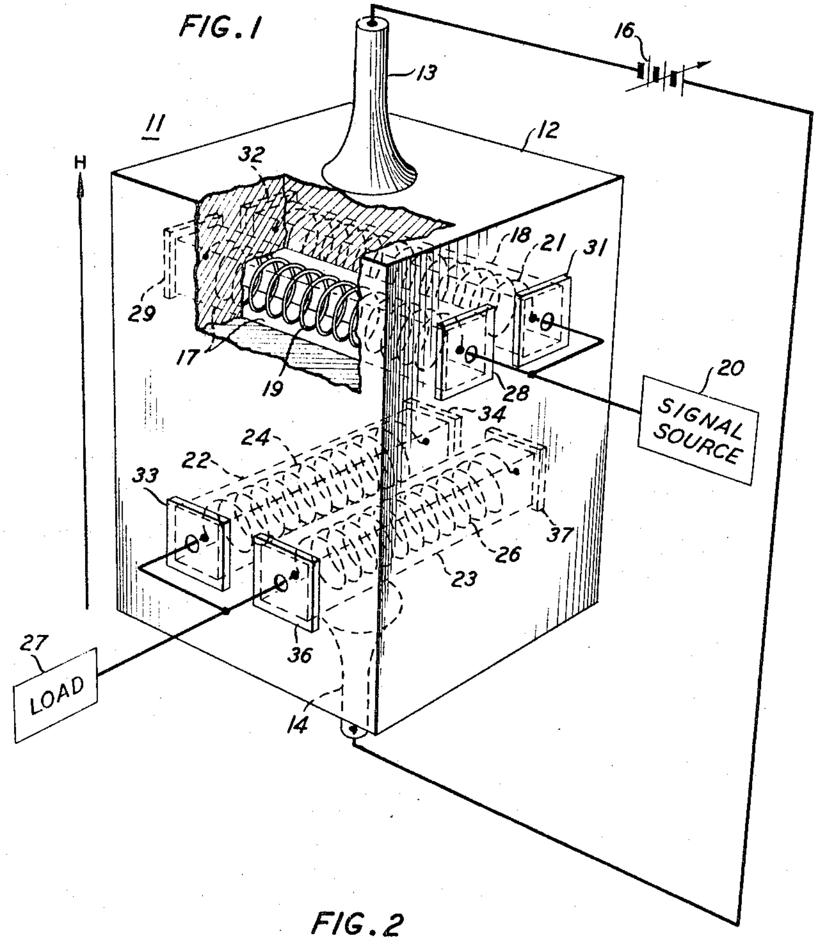
FIG. 1 is a partially schematic, partially perspective view of a first illustrative embodiment of the invention.

Before a discussion of the specific illustrative embodiments of the invention, a discussion of certain general principles will be helpful to a better understanding of the invention.

In a block of material having high charge mobility, such as bismuth, for example, and which is immersed in a magnetic field H, application to the material of a voltage E parallel to the magnetic field H produces a drift current, that is, a movement of charge carriers parallel to the electric field E. The charge carriers are electrons and holes which, for simplicity, are assumed to have equal densities, and they move in opposite directions under the influence of the field E. When a radio frequency signal is applied to the sample so that a plane polarized wave is launched in the sample parallel to the drift current, the electrons and holes act upon the wave in different ways. Assume that the wave propagates in the direction of the electron movement and opposite to the direction of hole movement. The velocity of propagation $V_p$ of the wave is dependent in part on the magnetic field H and is less than the electron average velocity. In this case, the energy of the moving electrons is utilized for amplification, while the energy of the holes acts both to increase the effective dielectric constant and thus cause a slowing of the wave velocity $V_p$ of the material and unavoidably to attenuate the wave. It is characteristic of such materials as bismuth that the electron drift velocity and the hole drift velocity are different because of the difference in the drift mobility $\mu_{De}$ and $\mu_{Dh}$ of the electrons and holes, respectively, in bismuth. Additionally, to the extent that there is an electron flow in the direction of wave propagation, the amplification process is analogous to that of a traveling wave tube. However, there is no electron bunching as in a traveling wave tube, although it is necessary for amplification that the electron drift velocity exceed the velocity of the propagating wave. If there were no electron flow or if the electron velocity equalled or was less than the wave velocity, the holes, flowing opposite to the direction of wave propagation, would extract energy from the wave, thereby attenuating it and there would be no amplification. It is necessary, therefore, that the electron drift velocity be greater than the wave velocity.

An additional requirement for amplification, in the case of equal magnitude of coupling of the electron and hole energy to the wave, is that the electron drift velocity relative to the wave velocity must exceed in magnitude the hole drift velocity relative to the wave velocity sufficiently to overcome the attenuating effects of the drifting holes. As an example the electron drift velocity may be as much as four times the hole drift velocity. In other cases it may be still greater, or less than four times as great. The effectiveness of the drift velocity of the carriers relative to the wave velocity in transferring energy is determined, in part, by the Hall mobility of the electrons and holes. Advantageously, these mobilities are different from each other and of opposite ratio to the ratio of drift mobilities. This relationship requires a material with anisotropic mobilities. It is characteristic of bismuth that the Hall mobilities for the electron and holes are different and the anisotropy requirements can be fulfilled with suitable crystal orientation. In the anisotropic case, the magnitude of energy coupling between the wave and the holes on the one hand and electrons on the other hand is different and the drift velocity relationship for equal magnitudes no longer has to be met. For maximum anisotropic effect, the charge flow is directed along one of the principal axes of symmetry of the crystal. The difference in Hall mobilities contributes to the attenuation by the holes and the amplification by the electrons in that it affects the coupling between the wave and the holes and electrons. The criterion for amplification can, therefore, be stated as follows:

$$\left(\frac{\mu_{De}}{\mu_{He}}-\frac{\mu_{Dh}}{\mu_{Hh}}\right)\frac{E}{V_p}>\frac{1}{\mu_{He}}+\frac{1}{\mu_{Hh}} \quad (1)$$

This relationship is based upon the assumption of equal electron and hole densities, and can easily be modified to take into account unequal densities.

The requisite conditions for amplification can be achieved by adjustment of the voltage and magnetic field, thereby adjusting the drift velocity and phase velocity, respectively.

It has been predicted analytically and can be verified experimentally that when a plane polarized wave is launched in the sample and it propagates in interacting relationship with the drift current, the two circularly polarized wave components which make up the plane polarized wave are acted upon differently by the charge flow. One of the circularly polarized waves is attenuated while the other is amplified. As a consequence, in the presence of moving charges, a plane polarized wave becomes a helicon wave since one component of circular polarization dies out. On the other hand, in the absence of moving charge, or outside of the interaction region, the plane polarized wave remains plane polarized and is attenuated by the sample itself and is not extracted by detectors. Such a wave is known as an Alfven wave. This behavior of the signal wave, which may have a frequency ranging from the low radio frequencies into the microwave range, is utilized to accomplish certain of the objects of the present invention, as will be explained more fully hereinafter.

Turning now to the drawings, there is shown in FIG. 1 an amplifier 11 embodying the principles of the present invention. Amplifier 11 comprises a block 12 of material such as, for example, bismuth or antimony or other suitable material having a high charge mobility, at either end of which are soldered electrical contacts 13 and 14. Contacts 13 and 14 are connected to a source 16 of variable voltage, shown here as a battery. Source 16 and contacts 13 and 14 act to produce an electric field within block 12 which produces a charge current or flow within the material between the two ends of the block. A magnetic field H parallel to the electric field and the charge flow and which penetrates through the block 12 is produced by suitable magnetic means. The magnetic field producing means may take any one of a number of forms well known in the art, such as a single solenoid or permanent magnet, or an arrangement of several magnets. A solenoid, because of the simplicity with which the magnetic field may be varied, is preferable, although not necessary.

Adjacent one end of block 12 are a first pair of spaced parallel holes 17 and 18 which are drilled through block 12 and are oriented at right angles to the direction of the magnetic field and the charge flow, as shown. Within holes 17 and 18 are a pair of coils 19 and 21, respectively, which are connected to each other and to a source 20 of signals to be amplified. Coils 19 and 21 serve as transducers to launch a plane polarized signal wave in block 12 having a direction of propagation parallel to the charge flow. It is to be understood that coils 19 and 21 are merely representative of a number of types of transducers which might be used. For example, holes 17 and 18 may be resonant chambers, an arrangement especially feasible at higher signal frequencies, which themselves launch the plane polarized wave. In like manner, signal source 20 may take any one of a number of forms well-known to workers in the art.

Adjacent the other end of block 12 opposite contact 14 is a second pair of spaced parallel holes 22 and 23 which are drilled through block 12 at right angles to the direction of the electric and magnetic fields, and at right angles to the direction of holes 17 and 18. Located in holes 22 are output transducers 24 and 26, respectively, shown here as coils, but which, as in the case of input transducers 19 and 21, may take any one of a number of forms. Transducers 24 and 26 are connected to each other and to a load or utilization device 27, as shown. Load 27 may be any one of a number of arrangements, depending upon the use to which amplifier 12 is being put. It may, for example, be another stage of amplification, a transformer, or an antenna, to name a few of the many alternatives.

Input transducers 19 and 21, and output transducers 24 and 26, in addition to launching and receiving electromagnetic waves, respectively, also tend to generate surface currents in holes 17, 18, 22, and 23. These currents, under ordinary conditions, tend to flow along the surface of block 12, between input and output, thereby deleteriously affecting the operation of amplifier 11. To prevent this leakage current, apertured conducting plates are utilized to close the open ends of the holes, thereby causing the surface currents generated within the holes to close upon themselves, which, in turn, prevents them from leaking along the surface of block 12. Thus, holes 17 and 18 are closed by apertured conducting plates 28, 29, and 31, 32, respectively, and holes 22 and 23 are closed by apertured conducting plates 33, 34 and 36, 37, respectively. The leads to the transducers are preferably insulated, at least where they pass through the conducting plates, so that they do not make conductive contact with the plates. Alternatively, the leads may be bare, or uninsulated, and the aperture in the plates may be filled with insulating material to prevent such contacts.

Figure 2:
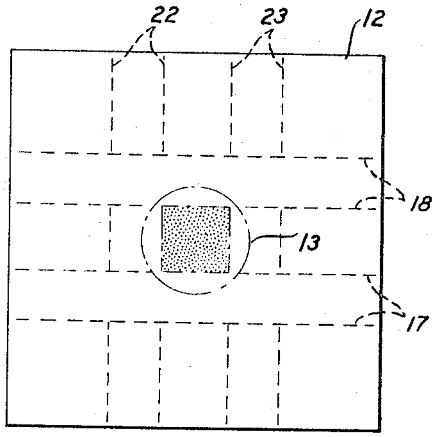
FIG. 2 is a plan view of a portion of the embodiment of FIG. 1.

As was pointed out in the foregoing, it is a feature of the present invention that the charge current or flow is confined to a limited cross-section path so that a high density flow is achieved. In the embodiment of FIGS. 1 and 2, this is accomplished by the arrangement of the input and output holes 17, 18 and 22, 23, respectively. Referring to FIG. 2, which is a plan view of block 12 of FIG. 1, it can be seen that the arrangement of holes is such that a centrally located clear path through the block is defined as shown by the cross-hatched area. Ordinarily, contact 13, which is greater in area than the central path, would tend to create a charge flow of cross-sectional area equal to its area. However, because the path of this flow is interrupted by the holes 17, 18, 22, and 23, the charge flow is restricted to the cross-hatched cross section. As a consequence, for a given applied current, there is a greater density of charge flow than there would be without the particular hole arrangement. It can be appreciated that the diameter of contacts 13 and 14 should not be greater than the dimension defined by the outer surfaces of the holes. If it were greater than this dimension, there would also be current flow in the outer areas of the block 12 which also afford straight-through current paths. Many materials, including bismuth, antimony and others with high charge mobility, exhibit magneto-resistivity. In such materials, the resistance to charge flow parallel to the magnetic field, whether the charge be holes and electrons in equal or unequal numbers or electrons alone or holes alone, is much less than the resistance to charge flow transverse to the field. In such materials, and with this combination, the current tends to align itself with the magnetic field. This phenomenon of magneto-resistivity is well known in the art. As a consequence the cross-sectional area of the charge flow does not increase to any appreciable extent in a device, as shown in FIGS. 1 and 2 and the stated conditions for amplification are assured by the self alignment of the current. In the absence of such magneto-resistivity, the charges would tend to diverge from their path of flow, thereby decreasing the number of charges available for amplification.

In operation, transducers 19 and 21 launch a wave in block 12 having a direction of propagation parallel to the charge flow. As was pointed out before, this launched wave becomes a helicon wave having a circular polarization. Because of the ninety-degree orientation of these transducers, substantially all of the wave is detected at the output, but any portion of the plane polarized wave outside the interaction region arrives at the output with its electric vector at ninety degrees to the pickup coil, hence, virtually none of this portion of the wave is detected. Since the wave completely permeates the cross section of the charge flow, all of the charges are utilized for amplification.

Figure 3:
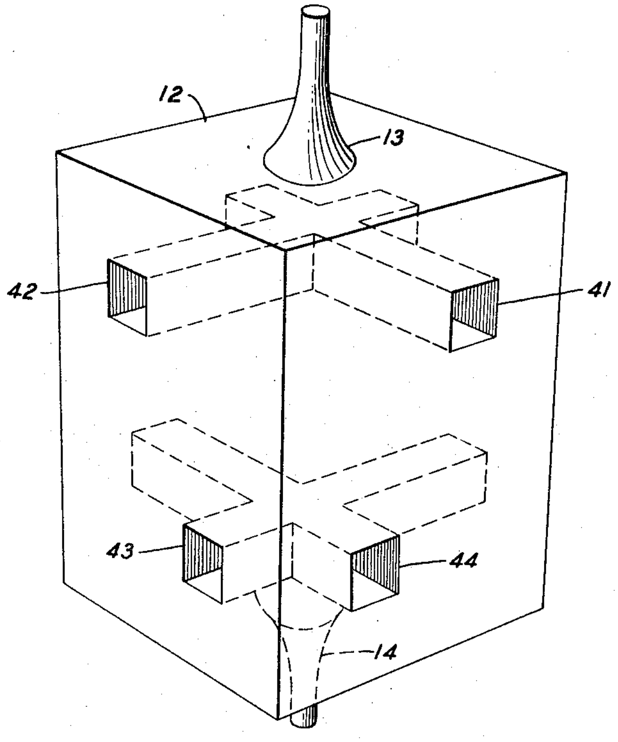
FIG. 3 is a perspective view of a second illustrative embodiment of the invention.
Figure 4:
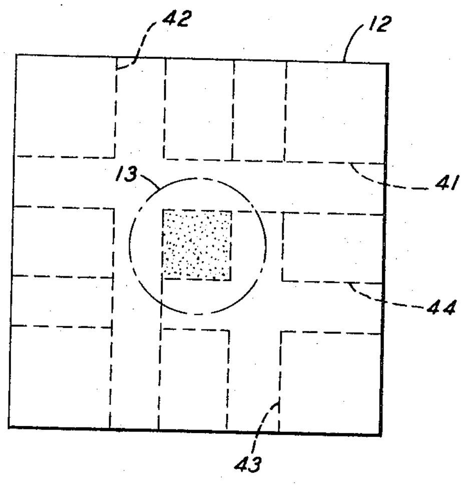
FIG. 4 is a plan view of the embodiment of FIG. 3.

In FIGS. 3 and 4, there is depicted an alternative arrangement for constraining the current flow to a limited cross-sectional area. For simplicity, the various connections, transducers and the other elements of the arrangement of FIG. 1, are not shown. Also for simplicity, certain reference numerals are the same as in FIG. 1. The arrangement of FIGS. 3 and 4, instead of having a parallel pair of input holes and output holes, has a pair of input holes 41 and 42 which are normal to each other and intersect at a point removed from the central axis of block 12, as best seen in FIG. 4. In like manner, a pair of output holes 43 and 44 are drilled through block 12 normal to each other and intersect at a point removed from the central axis of block 12 and on the other side of that axis from the point of intersection of holes 41 and 42, as best seen in FIG. 4. As a result of this configuration, the current or charge flow is confined to the cross-hatched area shown in FIG. 4. The input and output transducers, in this case a single input transducer and a single output transducer, are oriented at an angle to each other, in this case a right angle. The configuration of FIGS. 3 and 4 permits an additional current constraint by tilting the block 12 in a diagonal plane as shown in FIG. 3. Since the currents tend to follow the magnetic field, which is then at an angle to the axis along which contacts 13 and 14 line, the cross-sectional area of the current path is decreased.

During the operation of the device, as depicted in FIGS. 1 through 4, which is immersed in a coolant, which, for simplicity, is not shown, the limiting factor in obtaining large drift velocities is heating. With ordinary materials, a significant temperature gradient exists between the center of the material, where the charge flow occurs, and the surface of the material which is in contact with the coolant. As a consequence, the center of the block heats up and materially impairs operation. Materials, such as bismuth and antimony, on the other hand, are characterized by excellent thermal conductivity due to a long mean-free phonon path, which has the effect of placing the current path in intimate thermal contact with the cooled surface of the material, thereby virtually eliminating any temperature gradient and maintaining the interior of the block at a desired low temperature. In the case where it is necessary to "pot" a material in a heat sink, the interface produces a large temperature gradient, and also there is expansion and contraction of the dissimilar materials.

In addition to the current constraining arrangement used in FIGS. 1 through 4, several other alternative arrangements may be used. These arrangements are depicted in FIGS. 5 through 9. While these arrangements are all adaptable to an amplifier arrangement, as shown in FIG. 1, they are also adaptable for use in other types of solid state devices, such as, for example, Hall effect devices. All of the arrangements, in common with those of FIGS. 1 through 4, produce a concentrated current flow in a device having a large surface area, which permits superior cooling. For simplicity, the various elements of the amplifier arrangement of FIG. 1 have not been shown.

Figure 5:
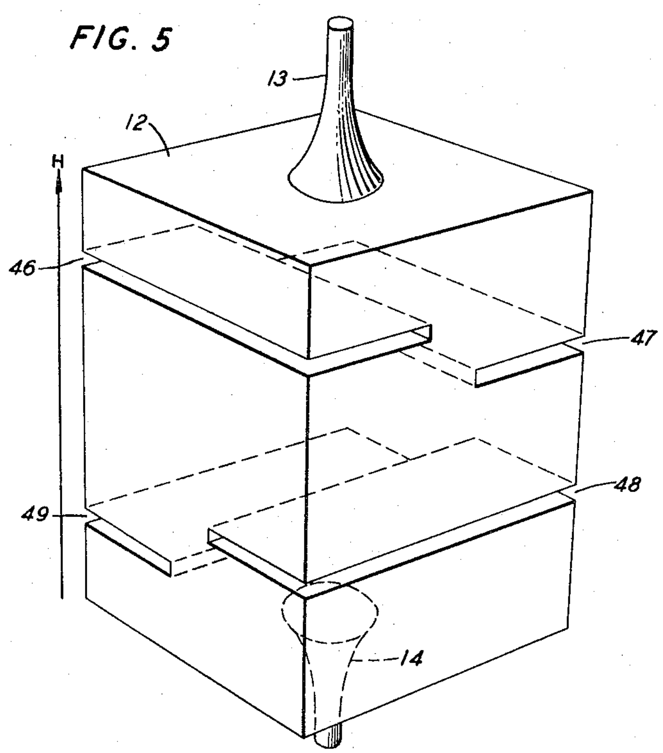
Figure 6:
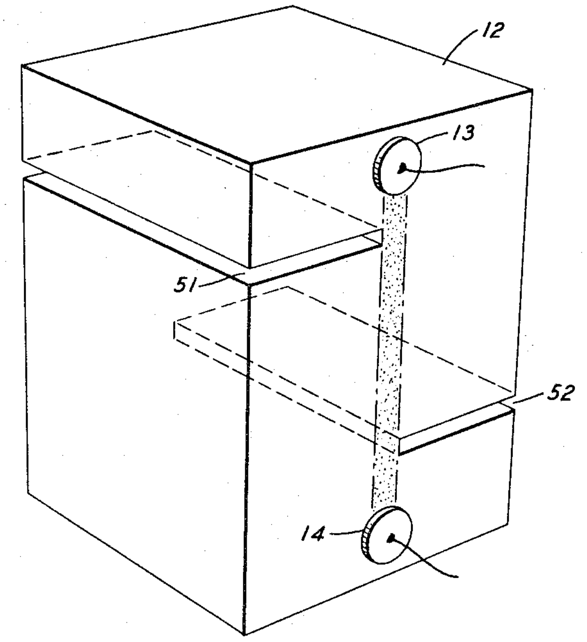

The arrangement of FIG. 5 is somewhat similar to the arrangements of FIGS. 1 through 4, but instead of holes, a plurality of slits 46, 47, 48, 49, oriented as shown, are cut in block 12. This arrangement has the advantage that it can, with a sufficient number of slits, constrain the current even in the absence of the magnetic field H or where there is a low magneto-resistive ratio. Obviously, as the magneto-resistive ratio decreases, the tendency of the current to flow transversely, or "spread out," increases. As a consequence, even with a magnetic field H, the number of slits used to confine the current may be increased to overcome the effect of the decreased ratio. In FIG. 6, a modification of the arrangement of FIG. 5 is shown, the current or charge flow being confined to a surface of block 12 and constrained by slots 51 and 52, as shown. Because the current flow is, in effect, two dimensional, it is necessary to constrain it in only one dimension, hence, it is not necessary to orient the slits normal to each other as with the arrangement of FIG. 5.

FIG. 7 depicts an arrangement wherein a single hole 53 is drilled through block 12, and contacts 13 and 14 are strips of conductive material at the ends of hole 53, as shown. As a consequence of this arrangement, the charge flow is in the form of surface current on the walls of the hole 53. This arrangement is especially useful at high frequencies where hole 53 functions as a waveguide for the applied signal. Hole 53 may, for example, have the cross-sectional dimensions of a waveguide for propagating waves of the frequency of interest therethrough. The charge flow is in the form of sheets of current along the walls of the guide, the magneto-resistance of the material preventing it from spreading transversely through the block 12 when a magnetic field H is supplied.

Inasmuch as the current flow within a block of material follows, or is parallel to, the magnetic field lines of force, the direction of current flow can be controlled by changes in the direction of the flux lines. In FIG. 8, there is depicted an arrangement whereby two solenoids, 54 and 56, are arranged so that their magnetic fields, as shown by the arrows, are in opposition whereby the current in block 12 is squeezed into a small cross-sectional area, thereby producing very high density current flow. An arrangement which produces a similar result is shown in FIG. 9, wherein contact 13 is a superconductor maintained at a superconducting temperature by any suitable means known in the art, as indicated by the dashed line. Inasmuch as a conductor in its superconducting state cannot be penetrated by a magnetic field, the field H is spread out in the area of contact 13. At the interface between block 12 and contact 13, there is no more superconductivity, and the field comes together, thereby squeezing the current into a narrow cross-sectional area, as shown.

From the foregoing, it can readily be seen that the present invention produces efficient high-gain amplification wherein thermal effects are minimized, maximum use is made of the available charge carriers, and leakage currents and extraneous straight-through signal transmission are minimized.

The foregoing embodiments of the present invention are by way of illustration of the inventive principles only. Other embodiments of the invention may occur to workers in the art without departing from the spirit and scope thereof.

What is claimed is:

1. In combination, an element of material having a large charge carrier mobility under the influence of an electric field, means for producing a magnetic field in said element, means for producing a charge carrier flow in said element parallel to the magnetic field at a velocity sufficient to product amplification of a wave propagating in said element, means for producing a traveling signal wave in said element, said wave traveling parallel to said charge flow and in coupling relation to the charge carriers in said flow, the velocity of said carriers being greater than the velocity of the wave, means for increasing the density of the charge carrier flow in a region substantially completely permeated by said signal wave comprising means for constraining the charge flow to a limited cross-sectional portion of said element extending along the length thereof, and means for abstracting signal energy from said element.

2. The combination as claimed in claim 1 wherein the means for increasing the density of the charge carrier flow comprises first and second pairs of spaced holes extending through said element, the holes of said first pair being parallel and adjacent one end of said element and the holes of said second pair being parallel and adjacent the other end of said element and oriented at right angles to the holes of said first pair.

3. The combination as claimed in claim 2 wherein signal input transducer means is located in said first pair of holes and the means for abstracting signal energy from said element comprises signal output transducer means located in said second pair of holes.

4. The combination as claimed in claim 1 wherein the means for increasing the density of the charge carrier flow comprises first and second pairs of holes extending through said element, the holes of said first pair being adjacent one end of said element and at right angles to each other, said holes intersecting at a point removed from the central axis of said element, said second pair of holes being adjacent the other end of said element and at right angles to each other, said holes intersecting at a point removed from the central axis of said element and on the other side of said axis from said intersection of said first pair of holes.

5. The combination as claimed in claim 4 wherein signal input transducer means is located in one of the holes of said first pair and the means for abstracting signal energy from said element comprises output transducer means located in one of the holes of said second pair, said output transducer means being oriented at right angles to said input transducer means.

6. The combination as claimed in claim 1 wherein the means for increasing the density of the charge carrier flow comprises a plurality of slits cut in said element normal to the direction of carrier flow and extending from opposed surfaces of the element toward the centerline of the charge carrier flow, said slits being terminated at a point spaced from said charge carrier flow centerline.

7. The combination as claimed in claim 1 wherein the means for increasing the density of the charge carrier flow comprises a hole drilled through said element and having electrical contacts connected to the inner surface thereof at either end of the hole, said hole being dimensioned to function as a waveguide to the signal wave.

8. The combination as claimed in claim 1 wherein the means for increasing the density of charge carrier flow comprises means adjacent one end of the element for establishing a magnetic field in opposition to the magnetic field in said element.

9. The combination as claimed in claim 1 wherein the means for increasing the density of charge carrier flow comprises at least one contact means contacting said element, said contact means being in a superconducting state and extending parallel to the magnetic field.

References Cited

UNITED STATES PATENTS

| | | | |
|---|---|---|---|
| 2,743,322 | 4/1956 | Pierce et al. | 330—6 X |
| 2,760,012 | 8/1956 | Peter | 330—5 |
| 3,197,651 | 7/1965 | Arlt | 330—6 X |
| 3,204,186 | 8/1965 | Capen et al. | 330—6 X |
| 3,274,406 | 9/1966 | Sommers | 330—5 |

OTHER REFERENCES

Legendy: "Physical Review," Sept. 14, 1965, pp. A1713–A1714.

ROY LAKE, *Primary Examiner.*

D. R. HOSTETTER, *Assistant Examiner.*